United States Patent
Reichel et al.

(10) Patent No.: US 9,156,497 B2
(45) Date of Patent: Oct. 13, 2015

(54) DRIVER ASSISTANCE SYSTEM AND METHOD FOR AUTHORIZING AN AUTONOMOUS OR PILOTED GARAGE PARKING

(71) Applicant: Audi AG, Ingolstadt (DE)

(72) Inventors: Michael Reichel, Ingolstadt (DE); Mohamed Essayed Bouzouraa, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/136,456

(22) Filed: Dec. 20, 2013

(65) Prior Publication Data

US 2014/0180523 A1 Jun. 26, 2014

(30) Foreign Application Priority Data

Dec. 22, 2012 (DE) .......................... 10 2012 025 317

(51) Int. Cl.
*B62D 15/00* (2006.01)
*B62D 15/02* (2006.01)

(52) U.S. Cl.
CPC .................................. *B62D 15/0285* (2013.01)

(58) Field of Classification Search
USPC .......... 701/23, 25, 28, 41; 348/148, 151, 153; 340/932.2, 933, 937; 342/61, 66, 342/70–71
See application file for complete search history.

(56) References Cited

U.S. PATENT DOCUMENTS

| 5,764,015 | A | 6/1998 | Shimizu et al. | |
|---|---|---|---|---|
| 8,489,281 | B2 | 7/2013 | Reichel et al. | |
| 2005/0273236 | A1* | 12/2005 | Mori et al. | 701/41 |
| 2006/0235590 | A1* | 10/2006 | Bolourchi et al. | 701/41 |
| 2008/0239078 | A1* | 10/2008 | Mohr et al. | 348/148 |
| 2008/0281490 | A1* | 11/2008 | Wittig | 701/41 |
| 2010/0238291 | A1* | 9/2010 | Pavlov et al. | 348/148 |
| 2011/0276225 | A1* | 11/2011 | Nefcy et al. | 701/41 |
| 2013/0002871 | A1* | 1/2013 | Natroshvili et al. | 348/148 |
| 2013/0033602 | A1* | 2/2013 | Quast et al. | 348/148 |
| 2013/0085637 | A1 | 4/2013 | Grimm et al. | |
| 2013/0142598 | A1* | 6/2013 | Mocquard et al. | 414/228 |
| 2014/0107888 | A1* | 4/2014 | Quast et al. | 701/36 |

FOREIGN PATENT DOCUMENTS

| CN | 102407848 | 4/2012 |
|---|---|---|
| DE | 103 31 948 | 2/2005 |

(Continued)

*Primary Examiner* — Yonel Beaulieu
(74) *Attorney, Agent, or Firm* — Henry M. Feiereisen LLC

(57) ABSTRACT

A driver assistance system for authorizing an autonomous, piloted parking of a vehicle into and out of a target standing surface includes a sensor system detecting measuring values during at least one drive of the vehicle from a first position in a vicinity and outside of the target standing surface to a second position inside the target standing surface and from the second position back to the first position, an analysis device determining based on the detected measuring values, properties of the vehicle and the capability of control-, regulation- and sensor-devices of the vehicle for an autonomous and piloted parking into and out of a parking space, whether the vehicle is capable of an to autonomous or piloted parking into the target standing surface and out of the target standing surface; and a memory device, wherein the driver assistance system is constructed to store an authorization data set for the autonomous or piloted parking into and out of the target standing surface in the memory device when the analysis device determines that the vehicle is capable to autonomous or piloted parking into the target standing surface and out of the target standing surface.

9 Claims, 1 Drawing Sheet

(56) References Cited

FOREIGN PATENT DOCUMENTS

| DE | 102005009703 | 9/2006 |
| DE | 102008002598 | 1/2009 |
| DE | 102008027692 | 12/2009 |
| DE | 102008033925 | 1/2010 |
| DE | 102009003298 | 11/2010 |
| DE | 102010023162 | 12/2011 |
| EP | 2 302 608 | 3/2011 |

* cited by examiner

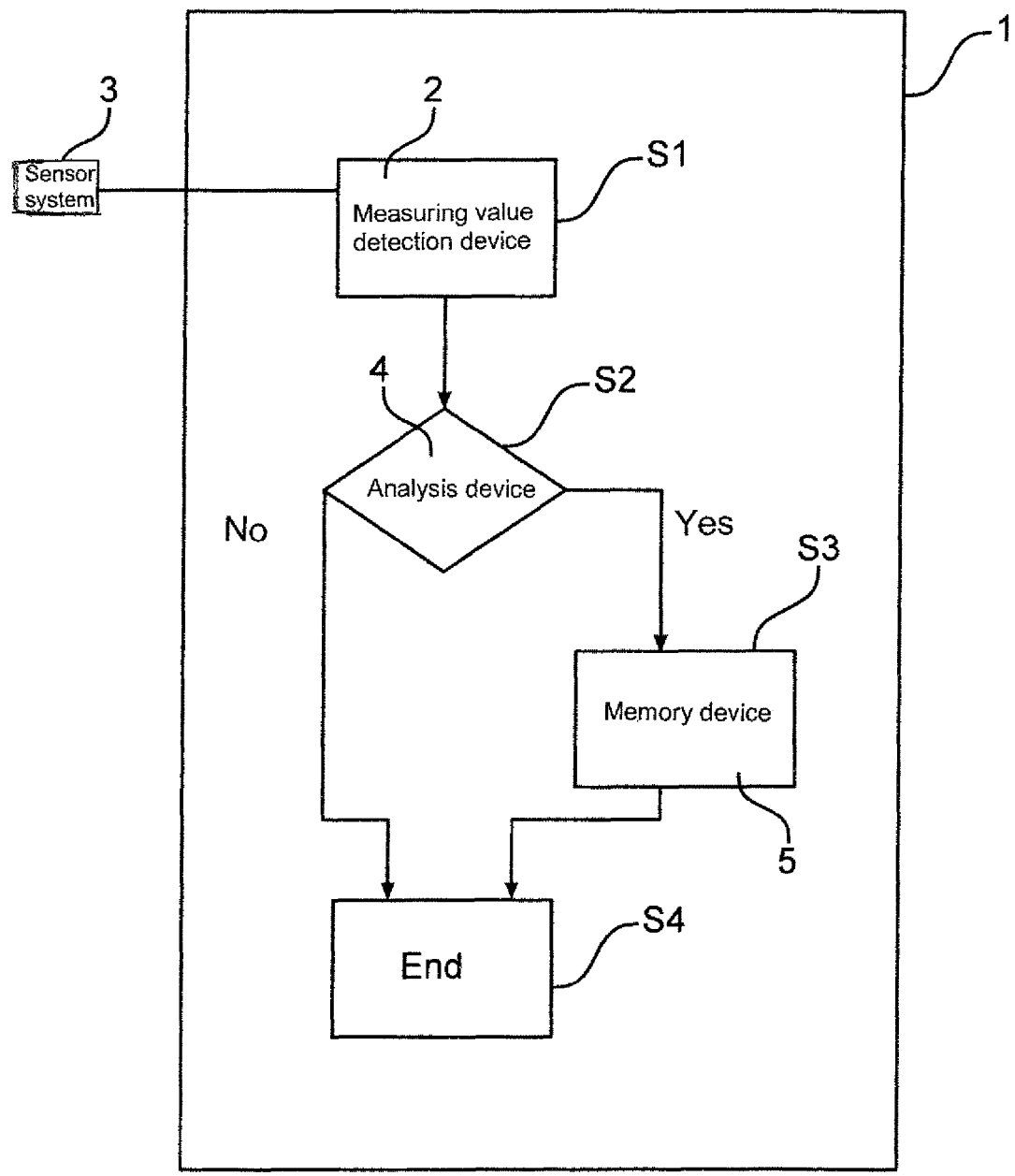

DRIVER ASSISTANCE SYSTEM AND METHOD FOR AUTHORIZING AN AUTONOMOUS OR PILOTED GARAGE PARKING

CROSS-REFERENCES TO RELATED APPLICATIONS

This application claims the priority of German Patent Application, Serial No. 10 2012 025 317.6, filed Dec. 22, 2012, pursuant to 35 U.S.C. 119(a)-(d), the disclosure of which is incorporated herein by reference.

BACKGROUND OF THE INVENTION

The present invention relates to a driver assistance system and method for approving an autonomous or piloted garage parking.

The following discussion of related art is provided to assist the reader in understanding the advantages of the invention, and is not to be construed as an admission that this related art is prior art to this invention.

For many years driver assistance systems have been an important aspect in the field of development of motor vehicles. In most cases driver assistance systems are electronic or electronically controlled additional devices in the (motor) vehicle for supporting the driver or user in certain driving situations. Driver assistance systems can serve for making the operation of a motor vehicle more comfortable and/or safer.

Examples for driver assistance systems are the anti-blocking system (ABS), the driving dynamic control (ESP), the adaptive high beam assistant, the rain sensor, the emergency brake assistant, the distance control assistant, the lane change assistant, the lane recognition assistant or stop assistant and the traffic sign recognition.

A further example for driver assistance systems are parking support systems or parking assistance systems which make it easier for a driver to park the motor vehicle into a parking lot or which park the motor vehicle into a parking lot entirely autonomously.

Parking assistance systems usually have one or multiple sensors with which the vicinity of the motor vehicle is scanned for obstacles and/or free spaces. When a parking lot is recognized, the parking assistance system either provides information for the driver for the correct parking of the motor vehicle or—in the case of active park steering assistance systems—autonomously performs all processes required for the correct parking, and autonomously controls the vehicle systems required for these processes.

According to the current state-of-the-art it is possible to have a park assistant steering the motor vehicle into a parking lot. In principal this requires a driver who oversees the process, actively initiates the process and continuously attends the process (for example by actively actuating the key, gas and brake control etc.). A goal of development are piloted or autonomous parking systems without involvement of a person in the actual parking process. A direction within this development is autonomous garage parking in which the driver can place his car in a defined position in a region to be defined, exit the car, activate the parking function and leave the car behind.

It would be desirable and advantageous to provide an improved driver assistance system for authorizing an autonomous or piloted garage parking in situations of a multitude of possible garage standing surfaces or target standing surfaces.

SUMMARY OF THE INVENTION

According to one aspect of the present invention, a driver assistance system for authorizing an autonomous, piloted parking of a vehicle into and out of a target standing surface includes: a sensor system detecting measuring values during at least one drive of the vehicle from a first position in a vicinity and outside of the target standing surface to a second position inside the target standing surface and from the second position back to the first position, an analysis device determining based on the detected measuring values, properties of the vehicle and the capability of control-, regulation- and sensor-devices of the vehicle for an autonomous and piloted parking into and out of a parking space, whether the vehicle is capable of an to autonomous or piloted parking into the target standing surface and out of the target standing surface; and a memory device, wherein the driver assistance system is constructed to store an authorization data set for the autonomous or piloted parking into and out of the target standing surface in the memory device when the analysis device determines that the vehicle is capable to autonomous or piloted parking into the target standing surface and out of the target standing surface.

According to another advantageous feature of the invention, the at least one drive includes multiple drives from the first position to the second position and from the second position back to the first position.

During multiple parking into and out of a parking space, different first and different second positions of the vehicle will occur. Therefore a greater number of different measuring values are available to the analysis device after multiply parking into and out of a parking space which measuring values enable a more accurate determination whether for a specific target standing surface an autonomous or piloted parking into and out of the target standing surface can be authorized.

According to another advantageous feature of the invention, the driver assistance system is configured to detect as measuring values at least one course of the pitch angle, yaw angle and/or roll angle relative to the target standing surface; at least one course of the steering angle and/or the steering moment; at least one trajectory; data containing or being based on at least one friction coefficient and/or one visibility condition; and/or raw data and/or further processed data of environmental sensors.

According to another advantageous feature of the invention, the driver assistance system is configured to store in the authorization data set data relating to an appearance of the target standing surface, classification results of the target standing surface and a location of the target standing surface for recognizing the target standing surface.

According to another advantageous feature of the invention, the driver assistance system can be configured to use a vehicle-external recognition means and/or a Car2 infrastructure system for recognition of the target standing surface.

When a parking into and out of a parking space according to the invention has been authorized, it is advantageous when the driver assistance system is configured to assist the user once or repeatedly by means of devices in or outside the vehicle to achieve an appropriate position of the vehicle for carrying out an autonomous or piloted parking procedure.

For this, the driver assistance system can be configured according to the invention to perform the assistance based on signals that can be visually and/or acoustically perceived by a person.

Advantageously the driver assistance system can be configured to assist the user in that the driver receives support for arranging at least one marking on the ground, a wall and/or ceiling for an appropriate pose of the vehicle, the driver is shown in which region in the vicinity outside the target standing surface the vehicle has to be moved for an appropriate position and/or additional items of information relating to the pose are signaled to the driver.

According to another aspect of the present invention, a method for approving an autonomous or piloted parking of a vehicle into and out of a target standing surface has for autonomous or piloted parking into and out of a parking space, comprising: driving the vehicle at least once from a first position in the vicinity of and outside of a target standing surface to a second position inside a target standing surface and from the second position to a first position in the vicinity of and outside of the target standing surface; detecting measuring values with a sensor system of the vehicle; determining with an analysis device based on the detected measuring values, properties of the vehicle and the capabilities of control-, regulation- and sensor-devices of the vehicle for an autonomous or piloted parking into and out of a parking space, whether the vehicle is capable of autonomous or piloted parking into and out of the target standing surface; and storing an authorization data set for an autonomous or piloted parking into and out of the target standing surface when it is determined in the determining step that the vehicle is capable of autonomous parking into and out of the target standing surface.

BRIEF DESCRIPTION OF THE DRAWING

Other features and advantages of the present invention will be more readily apparent upon reading the following description of currently preferred exemplified embodiments of the invention with reference to the accompanying drawing, in which the sole Figure shows a schematic representation of the driver assistance system and an exemplary course of the invention as it is carried out by the driver assistance system according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The Figure shows an exemplary embodiment of the method according to the invention, wherein in step S1 during a drive of the vehicle by the user from a first position in the vicinity of and outside of the target standing surface to a second position inside a target standing surface, and from the second position back to the first position in the vicinity of and outside of the target standing surface, measuring values are detected by means of a sensor system of the vehicle by a measuring value detection device 2, in a step S2 based on the detected measuring values, the properties of the vehicle and the capabilities of the devices of the vehicle for an autonomous and piloted parking into and out of a parking space it is determined by a—in the present example vehicle-own—analysis device 4, whether the vehicle is capable of autonomous or piloted parking into and out of the target standing surface. When the result in step S2 is positive (yes) the authorization data set for an autonomous or piloted parking into and out of the target standing surface is stored by a—in the present example also vehicle-own—memory device 5 in step S3 and the method terminated (step S4). When the result in step S2 is negative (no) the method is terminated without storing a release data set (step S4).

The term "in the vicinity" means the region from which the driver of a vehicle usually starts the parking procedure into a target standing surface. In the case of a garage, which can be closed by a garage gate, this is for example a distance between a part of the vehicle that is closest to the garage gate which still allows opening of the garage gate (for example a distance of only 1 cm of the closest vehicle part from the garage gate) up to a distance of the closest vehicle part of up to about 8, 9 or 10 meters from the garage gate. Similarly, a driver will start a parking procedure, for example in case of a standing surface in a parking garage, after he has passed the garage gate of the parking garage at a distance of the closest vehicle part of up to about 8, 9 or 10 m to the closest marking with which the parking garage standing surface is marked. According to the invention the vicinity can of course include all appropriate distances such as 7 meters, 6 meters, 5 meters, 4 meters, 3 meters, 2 meters, 1 meter, 50 cm, 20 cm, 10 cm etc.

The length traveled from the first position in the vicinity of and outside of a target standing surface to a second position inside a target standing surface is generally not limited. For example in the case of a greater garage or a greater carport which has several target standing surfaces this path can thus be several 10 m and/or in the case of a garage which extends over multiple levels can also be several hundred meters long. In the case of small (for example private) garages or carports with only a few or also only one target standing surface, this path may also be only several meters.

The term "inside a target standing surface" relates to the region, which is usually defined as standing place for the vehicle. In the case of a greater garage with multiple target standing surfaces, this is for example the region which is correspondingly marked for one respective vehicle by respective markings on the ground and/or wall. A target standing surface can also be defined by constructive circumstances for example by a front wall and two sidewalls, by a front wall and two lateral support pillars, by the dimensions of a duplex parking lot, carport lot, etc.

The term "autonomous parking into and out of a parking place" relates to the procedure of parking into and out of a parking space in which after starting the procedure by a user the further procedure of a parking into or out of a parking space occurs entirely automatically until termination of the procedure. The procedure may also be interrupted or terminated automatically.

The term "piloted parking into and out of a parking space" relates to a procedure of parking into and out of a parking space in which after starting the procedure by a user the process is also carried out automatically until termination of the procedure, however, the user either has to continuously perform a control action during the procedure (for example keeping a button pushed) and/or the user can interrupt or terminate the process at any time by a control action.

The driver assistance system according to the invention detects during the at least one drive data (metric values) by a sensor system of the vehicle. These may include all appropriate measuring values, for example such which relate to the vehicle-internal processes (for example steering angle) and/ or such which relate to the vicinity of the vehicle (for example distance to the outer edges of the vehicle to obstacles).

A person skilled in the art knows or can determine by means of a few tests which measuring value or combination of measuring values is useful or required in the case of a given vehicle having predetermined devices for autonomous or piloted parking into and out of a parking space, whether authorizing an autonomous or piloted parking of the vehicle into and out of a parking space is sufficiently safe. Therefore, the driver assistance system can be configured for detecting different measuring values and/or combinations of measuring values depending on the vehicle type and on the capabilities of the devices of the vehicle for an autonomous or piloted parking into and out of a parking space.

For example, the measuring values that can be detected by the driver assistance system during the at least one drive include at least one course of the nick gear and/or rolling angle relative to the target standing surface, at least one course of the steering angle and/or the steering moment, at least one trajectory, data which include at least one friction coefficient and/or a visibility condition or are based thereon and/or raw data and/or processed data from environmental sensor devices.

Depending on the target standing surface (length, width, height, size of the access etc.), vehicle properties (length, width, height, curved radius, etc.) and properties of the devices of the vehicle for an autonomous for piloted parking into and out of a parking space it may be sufficient when only measuring values relating to a single criterion are detected.

For example, when it is clear that the dimensions of the target standing surface and the position of the access opening to the target standing surface relative to the vehicle to be parked therein in an autonomous or piloted manner, are sufficient and the devices of the vehicle for an autonomous or piloted parking into and out of a parking space have sufficient capabilities for the given target standing surface, the detection of a single criterion may be sufficient whether an autonomous or piloted parking into and out of a parking space may be released or not for this target standing surface for this vehicle.

When in the above-described case for example the access to the target standing surface has a slope, it may be determined by measuring values which allow concluding or indicate a non-sufficiently high friction coefficient between the ground and the wheels, that for this type of standing surface an autonomous piloted parking into and out of a parking space cannot be authorized, because this would be associated with an undue safety risk. In this case no further criterion for the decision would be required.

Similarly, in the above-described case there may be a covering for example in the form of a pillar around which the user has to drive with his vehicle in order to park into the target standing surface. Also in such a case the properties of the devices of the vehicle for autonomous or piloted parking into and out of a parking space may not be sufficient. in this case it may be decided solely on the basis of data which describe the visibility whether an autonomous of piloted parking into and out of the parking space can be authorized or not.

Of course according to the invention measuring values may also be detected by multiple criteria, and as the case may be, combined and analyzed.

Depending on the given target standing surface, the properties of the vehicle (for example length, width, height, turning radius) and the properties of the devices of the vehicle for an autonomous or piloted parking into and out of a parking space, it may be useful or required that multiple drives of the vehicle are performed by the user from a first position in the vicinity of and outside of the target standing surface to a second position inside a target standing surface and from the second position to a first position in the vicinity of and outside of the standing surface, and in the course of these multiple drives measuring values are detected by means of a sensor system of the vehicle. Based on the measuring values which were detected during the multiple drives and which generally at least slightly deviate from each other, the analysis device then determine with even higher reliability whether the vehicle is capable of autonomous and piloted parking into and out of the target standing surface.

The analysis device can in all cases be an analysis device of the vehicle, for example in the form of a digital processing device which to date is present in many vehicles. This processing device can for example be a component of the head-unit or the control device which is used for an autonomous or piloted parking into and out of a parking space. However, the analysis device can also be a device external of the vehicle. For this, the detected data can for example be transmitted by means of a wire-bound or wireless connection to an analysis device appropriate therefore. The external analysis device then performs the analysis and the result of the analysis is transmitted back to the vehicle. Such an approach can for example be useful when the processing capacity of a processing unit present in the vehicle is not sufficient or the result of the drive(s) regarding a given target standing surface is to be externally stored for example for later reuse.

The properties that may be taken into account of the devices of the vehicle which are provided for an autonomous or piloted parking into and out of a parking space can for example include the number, the detection angle, the accuracy, (for example how accurate the dimensions of an entry way or a target standing surface can be detected), etc. of sensor systems of the vehicle for the vicinity of the vehicle. Or also the accuracy and speed with which the control devices and actuating system (for example for the motor, steering and brake control) required for an autonomous or piloted parking into and out of a parking space, are able to act or react during the autonomous piloted parking into and out of the parking space.

As properties of the vehicle—beside the properties of length width height and turn radius mentioned above—it can for example also be taken into account up to which nick, yaw and/or roll angle relative to the target standing surface the vehicle can still be safely moved. Or also whether the vehicle is a two wheel or four wheel drive vehicle, which ground clearance the vehicle has etc.

As can be seen from above non exclusive listing, a great number of different variations exist for the respective vehicle type as well as for the devices provided in the respective vehicle type for an autonomous or piloted parking into and out of a target standing surface. The criteria to be taken into account can therefore be different for each vehicle type and the devices respectively provided therein for an autonomous or piloted parking into and out of a target standing surface.

When the driver assistance system has determined that based on properties the vehicle the properties of the vehicle's devices provided for an autonomous or piloted parking into and out of a parking space, a safe autonomous piloted parking into a given target standing surface is possible, the authorization data set is stored in a memory device according to the invention. Any device with a non-volatile digital memory can serve as such a memory device. This memory device is preferably a vehicle-own memory device (for example one which is present in the control device, which controls the autonomous or piloted parking into and out of a parking space), however this is not strictly required. A vehicle-external memory device with which enables data communication for transmitting and accessing an authorization data set for a given target standing surface can also be provided.

Such a vehicle-external memory device has the advantage that authorization data sets which were generated by different vehicle types for different target standing surfaces can be stored therein. Thus, it may not be required for the user of the certain vehicle type (optionally with the predetermined equipment for an autonomous or piloted parking into and out of a parking space) in the case of a given target standing surface to carry out the described at least one parking into and out of a parking space himself if at least one authorization data set is present in the vehicle-external memory device for the given target standing surface for the vehicle type used by the driver and can be accessed by the vehicle.

According to the invention it can also be provided that if vehicle own as well as a vehicle external memory device is provided wherein for example additional/new release data sets for target standing surfaces of interest are downloaded from the vehicle external memory device into the vehicle own memory device and stored for release data sets that exist already in the vehicle own memory device can be updated (in case for example when certain characteristics of the target standing surface for the vehicle have changed).

The authorization data set contains the required data in order to ensure prior to a start of the autonomous or piloted parking procedure by the user, that a vehicle actually parks into the authorized target standing surface and not into another different target standing surface. For this, for example data relating to the appearance, classification results and/or the position of the target standing surface can be stored in the authorization data set for recognizing the target standing surface.

For this, for example one or multiple images of the target standing surface, access to, the entrance of and/or immediate vicinity of the target standing surface can be recorded by a camera device of the vehicle and stored in the memory device. By means of the camera device of the vehicle one or multiple images can be recorded again when reaching or approaching a target standing surface, and compared with the stored images. For this for example an image analysis program with appropriate image analysis algorithms can be used with which also images can be associated with each other which are not recorded from exactly the same position. As an alternative or in addition for example a classification result relating to a garage or carport entrance can be used for recognition. Also as an alternative or in addition for example the position coordinates of a target standing surface for an exit/entrance can be detected by means of a satellite-supported position determining-device and be compared with a stored position. In the near future it will be possible to determine the position of a target standing surface by means of satellite-supported position determination (assuming sufficient reception of satellite signals) down to a few centimeters accuracy.

It is further advantageous when the driver assistance system is configured to be able to use a vehicle-external recognition means and/or a car2infrastructure system for recognition of the target standing surface.

According to the invention, the control device determines, for example based on actually detected environmental data, in comparison with information stored in the authorization data set, whether the vehicle is located in the vicinity of a target standing surface, which has been already authorized once before. As an alternative or in addition a user can select the target standing surface in which vicinity he is located from stored authorization data sets.

Prior to the actual performance of an autonomous piloted parking procedure it can be verified by comparing with at least one vehicle-external recognition means and/or by using a car2infrastructure system, whether the vehicle is actually located in the vicinity of the target standing surface which was either determined by the control device or selected by the user.

The vehicle external recognition means can for example be a clearly recognizable recognition means which cannot be removed destruction-free, such as for example a landmark. These landmarks can have any appropriate shapes and functions. Examples of such landmarks are stickers (for example with a special barcode), NFC buttons, etc. These vehicle-external recognition means are preferably arranged in the vicinity of a target standing surface, on the ground, a wall or a ceiling of the garage or the carport and can be recognized by appropriate vehicle-own devices. The manner of the recognition is not limited and any appropriate manner can be used (for example visual recognition, use of GPS, WLAN, use of other short range radio systems).

When using a car2infrastructure system, a coded signal can for example be wirelessly transmitted from a transceiver of a vehicle for opening an electrically actuatable garage gate. When the garage gate opens in response thereto (which can be confirmed by receiving a corresponding signal from the control device of the garage gate or by means of image detection and analysis of the vehicle) it is ensured that the vehicle is located in the region of the assumed authorized target standing surface. Examples for a car2infrastructure system include a garage2car, car2garage, home technic2car, car2home technic, garage gate2car system etc.

Once a target standing surface was authorized by the driver assistance system, often times the question arises for a driver for in the context of an autonomous or piloted parking procedure where and in which position he has to place the vehicle in order for the devices in the vehicle for an autonomous or piloted parking into and out of a parking space to successfully perform the autonomous or piloted parking procedure.

Therefore it is advantageous when the driver assistance system is also configured to assist the user once or repeatedly by means of devices inside and/or outside the vehicle to achieve a position of the vehicle for performing an autonomous or piloted parking procedure.

Such assisting can for example be performed based on signals that can be visually and/or acoustically perceived by a person. Examples for such an assisting include:

The driver assistance system assists a user to place a marking on the ground (for example stop line) or another surface (wall, ceiling, etc.) which at least facilitates the finding of an appropriate position. Then the driver can orient himself on relative to the placed marking for placing the vehicle. For this, the driver assistance system can for example display an appropriate position of the marking by means of a corresponding lighting device; or a corresponding display can be shown on a display device for example in an image of the all-around view; a further example is an assisting by using an announcement or by means of a communication with a mobile device (mobile phone, smart phone). In the simplest case such an assisting only has to occur once per authorized target standing surface, for example when the user has successfully placed at least one marking. When this marking is lost or becomes unusable it can be provided that the user may activate this assisting by the driver assistance system again.

The driver assistance system assists a user when approaching a B sanity of a released target standing surface to drive up to an appropriate region from which an autonomous or piloted parking can occur. For this the driver assistance system can for example display an indication in an image of the all around view, or the driver assistance system can illuminate this region by means of a streamlined device. This can be a streamlined device of the vehicle or a stream light device outside the motor vehicle which can communicate with the driver assistance system.

The driver assistance system additionally provides information to the user relating to the position (for example the distance to a appropriate position, the suggestion for a appropriate trajectory for achieving the appropriate position etc.). These items of information can be provided to the user in any manner for example by means of a display device and/or an acoustically perceivable announcement.

The different procedures of the assisting can for example be combined in any conceivable manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A driver assistance system for authorizing an autonomous, piloted parking of a vehicle into and out of a target standing surface comprising:
    a sensor system detecting measuring values during at least one drive of the vehicle from a first position in a vicinity and outside of the target standing surface to a second position inside the target standing surface and from the second position back to the first position;
    an analysis device determining based on the detected measuring values, properties of the vehicle and the capability of control-, regulation- and sensor-devices of the vehicle for an autonomous and piloted parking into and out of a parking space, whether the vehicle is capable of an to autonomous or piloted parking into the target standing surface and out of the target standing surface; and
    a memory device, wherein the driver assistance system is constructed to store an authorization data set for the autonomous or piloted parking into and out of the target standing surface in the memory device when the analysis device determines that the vehicle is capable to autonomous or piloted parking into the target standing surface and out of the target standing surface.

2. The driver assistance system of claim 1, wherein the at least one drive comprises multiple drives of the vehicle from the first position to the second position and from the second position back to the first position.

3. The driver assistance system of claim 1, wherein the driver assistance system is configured to detect as measuring values at least one member selected from the group consisting of a course of a pitch angle relative to the target standing surface, a course of a rolling angle relative to the target standing surface, a course of a yaw angle relative to the target standing surface; a course of a steering angle, a course of a steering moment, a trajectory, data which include or are based on a friction coefficient, data which include or are based on a visibility; raw data from environmental sensor system devices, and processed data from environmental sensor system devices.

4. The driver assistance system of claim 1, wherein the driver assistance system is configured to store in the authorization data set data relating to at least one member selected from the group consisting of an appearance of the target standing surface, classification results of the target standing surface and a location of the target standing surface for recognizing the target standing surface.

5. The driver assistance system of claim 1, wherein the driver assistance system is configured to use at least one of a vehicle-external recognition means and a car2infrastructure system for recognizing the target standing surface.

6. The driver assistance system of claim 1, wherein the driver assistance system is configured to assist the user by means of devices of the vehicle or outside the vehicle to reach an appropriate position of the vehicle for performing the autonomous or piloted parking procedure.

7. Driver assistance system of claim 6, wherein the driver assistance system is configured to perform said assisting based on signals that can be visually and/or acoustically perceived by a person.

8. The driver assistance system of claim 1, further comprising
    means for supporting a user for placing at least one marking on at least one of a ground, a wall and a ceiling indicating an appropriate position of the vehicle,
    a display device displaying for the driver into which region in the vicinity outside the target standing surface the vehicle has to be moved for an appropriate position, and
    means for providing information to the driver relating to said position.

9. A method for approving an autonomous or piloted parking of a vehicle into and out of a target standing surface has for autonomous or piloted parking into and out of a parking space, comprising:
    driving the vehicle at least once from a first position in the vicinity of and outside of a target standing surface to a second position inside a target standing surface and from the second position to a first position in the vicinity of and outside of the target standing surface;
    detecting measuring values with a sensor system of the vehicle;
    determining with an analysis device based on the detected measuring values, properties of the vehicle and the capabilities of control-, regulation-and sensor-devices of the vehicle for an autonomous or piloted parking into and out of a parking space, whether the vehicle is capable of autonomous or piloted parking into and out of the target standing surface; and
    storing an authorization data set for an autonomous or piloted parking into and out of the target standing surface when it is determined in the determining step that the vehicle is capable of autonomous parking into and out of the target standing surface.

* * * * *